US011524223B2

(12) United States Patent
Lysenko (10) Patent No.: US 11,524,223 B2
(45) Date of Patent: Dec. 13, 2022

(54) SYSTEM AND METHOD FOR CONTROLLING VIRTUAL OBJECTS (71) Applicant: Alexey Vladimirovich Lysenko, Yekaterinburg (RU)

(72) Inventor: Alexey Vladimirovich Lysenko, Yekaterinburg (RU)

( * ) Notice: Subject to any disclaimer, the term of this patent is extended or adjusted under 35 U.S.C. 154(b) by 411 days.

(21) Appl. No.: 16/633,503

(22) PCT Filed: Jul. 30, 2018

(86) PCT No.: PCT/RU2018/050090
§ 371 (c)(1),
(2) Date: Jan. 23, 2020

(87) PCT Pub. No.: WO2019/027358
PCT Pub. Date: Feb. 7, 2019

(65) Prior Publication Data
US 2020/0226946 A1 Jul. 16, 2020

(30) Foreign Application Priority Data
Jul. 31, 2017 (RU) .......................... RU2017127259

(51) Int. Cl.
*A63F 13/212* (2014.01)
*G06F 3/01* (2006.01)
*G09B 9/00* (2006.01)
*G09B 19/00* (2006.01)

(52) U.S. Cl.
CPC ............ *A63F 13/212* (2014.09); *G06F 3/011* (2013.01); *G06F 3/016* (2013.01); *G09B 9/00* (2013.01); *G09B 19/0038* (2013.01)

(58) Field of Classification Search
CPC ............... G06F 3/011; G06F 2203/012; A63F 2300/8082; A63B 2071/0666
See application file for complete search history.

(56) References Cited

U.S. PATENT DOCUMENTS 10,796,541 B1\* 10/2020 Martin ..................... G06F 3/016
2010/0302233 A1\* 12/2010 Holland .................. G06T 19/00
707/E17.018

\* cited by examiner

*Primary Examiner* — Koosha Sharifi-Tafreshi

(57) ABSTRACT

The inventions relate to the input of data into virtual reality simulation systems and make it possible modeling the behavior of a real object by determining the user's efforts. The system contains tension cables for fixing a body in a stable equilibrium position with the possibility for rotation around at least one axis passing near its center of mass. It contains elements that determine the orientation of the body, as well as the magnitude and direction of the force acting at the body from the tension cables. There can be used one tension cable (suspension), two tension cables (stretching the body in opposite directions) in air or water environments (with buoyancy compensation). In the framework of the method, initial conditions of the environment, vectors of tension forces of the tension cables are determined, the vector of the force applied by the user is calculated, and the calculated force is used to simulate the behavior of the virtual object.

24 Claims, 8 Drawing Sheets

SYSTEM AND METHOD FOR CONTROLLING VIRTUAL OBJECTS

CROSS REFERENCE TO RELATED APPLICATIONS

This patent application is a U.S. National Phase filing of commonly owned and pending PCT Application No. PCT/RU2018/050090, filed Jul. 30, 2018, claiming priority from Russian Patent Application No. RU2017127259, filed Jul. 31, 2017, both which are incorporated herein by reference in their entirety.

BACKGROUND OF THE INVENTION

1. Field of the Invention

The group of inventions relates to virtual reality simulation systems, in particular, to data input devices for controlling a virtual object through user efforts. The claimed technical solutions can be applied in computer games, as well as in other simulators, for example, educational, recreational purposes, in three-dimensional modeling systems. The inventions make it possible to create realistic games or movement simulators in the virtual world, in particular, in the underwater world or in the fictional world with the physics of movement similar to swimming.

2. Description of the Related Art

The virtual reality market is developing dynamically, new tasks appear, for the solution of which, first of all, it is necessary to create effective systems for collecting data from a real environment used for simulation. The possibility for implementing the program as a whole, the degree of synchronization of the actions of real and virtual objects, and, finally, the degree to which the user is immersed in the virtual environment and his comfort depend on the quality of such methods.

Depending on the program scenario in virtual reality, the user can move independently, or using a virtual vehicle. Moreover, prolonged and sharp discrepancies between the orientation of the gravity vector in the real and virtual worlds can lead to the effect of nausea, which complicates using the simulator.

Auto, aviation, space simulators use special cabins or transport devices with many degrees of freedom, which, due to their size and cost, can be used mainly in special simulators or in virtual reality amusement rides.

Walking, running in virtual reality can either be controlled using the analog joystick of the game controller, as is the case in most ordinary computer games, such as Playstation™, or be directly related to leg movements. The most accurate in feel experience transmission is to recognize the user's actual movements in the room and translate them into corresponding movements in the virtual space. This approach allows to process almost arbitrary physical activity on a flat surface—jumping, squats, crawling, etc. However, it requires a sufficiently large room with a flat floor and the absence of obstacles, or with terrain and obstacles corresponding to the virtual gaming space. Therefore, most often, such systems are used within specialized sites of virtual amusement rides.

One of the important tasks facing the design of virtual reality simulation systems is the movement of a user over considerable distances in a virtual environment with limited spaces in reality. The main goal of such systems is to "absorb" real movements performed by the user. That is, in a virtual environment, the user can travel considerable distances, while maintaining the intensity of movement and, therefore, the maximum immersion in the virtual environment and realistic simulation.

To determine walking in confined spaces, various stationary installations have been developed to allow on-site movement. For example, devices with a design similar to a treadmill (U.S. Pat. No. 6,152,854A), special mobility platforms (WO2017019884A1), spherical and cup-shaped surfaces that return the legs of a walking user to its central part (see U.S. Pat. No. 5,846,134A, US2004242390A1), foot platforms (U.S. Pat. No. 5,902,214A). Such solutions control movement in the virtual world indirectly, and are limited to recognizing only walking and running on a flat surface.

Thus, the main goal of the systems is to provide an opportunity to compensate, "absorb" the user's movements, while presenting him with the opportunity to feel himself unlimited in space by any additional devices. The specified requirements to one degree or another are satisfied by systems that use tensioned cables to limit the user and compensate for movements.

In particular, a device is known for three-dimensional simulation of a medium with small gravity (for example, on Mars or the Moon) (WO2016153147 of 29 Sep. 2016, priority of 26 Mar. 2015 KR10-2015-0042229, IPC (2006.1) F16H 7/08, F16H 7/18), including a frame that forms a virtual space, cables connected to it and supporting the user above the platform, a winch for winding them (unwinding), a tension measuring device for each cable, a position measuring device (determining coordinates) of the user located on the frame, a tension controlling controller. With an approach to implementation similar to the claimed solution, the device solves a fundamentally different problem—the creation of a given level of gravity by exposing the user to a tensioned wire rope (cable) with controlled tension.

From the prior knowledge there are known the system and method for simulating movements (WO2006017926A1 of 23 Feb. 2006, priority of 20 Aug. 2004 IUS60/602857, IPC7 G09B 9/00, A61H 1/00, A63B 23/04), containing two rests for feet and arms and wire ropes attached to each independently of the others, drives for each of the wire ropes with tension controllers mounted on a frame that control the length of the cables and constrain the movement of the user. The system calculates the position and orientation of the user's legs in a virtual environment as a function of a wire rope length and provides feedback from user effort. The simulation method includes the following steps: determining the position and orientation of the user's legs, matching with a virtual environment to determine the interaction between them, and adjusting the wire rope length to provide feedback on the user's efforts as a function of such interactions. The system allows simulating a limited range of user's movements; it has a complicated structure and narrows the scope of its application. A particular challenge is the management of a virtual object in an aquatic environment.

A solution is known (U.S. Pat. No. 5,271,106A dated Dec. 21, 1993, priority Jun. 10, 1992, IPC A63B21/00, A63B69/12, E04H4/14, H04N7/18, E04H4/00), which is a swimming pool on the walls of which there are images of virtual water environment equipped with devices for creating currents (flows), the intensity of which depends on the activity of the swimmer, as well as with other additional effects. The solution does not allow the implementation of simulators requiring accuracy in determining the movements and (or) efforts of the user.

In addition, solutions are known for transferring the movements of a user under water into virtual reality. In particular, the method and system of virtual diving (US 2010/0302233 A1 of 2 Feb. 2010, IPC 2006.1 G06T17/00, G06F17/30, G09G5/00, G06F3/03, G06N5/02). The system includes at least three electronic elements located on the surface, determining the area of diving in the immediate vicinity of the desired place of diving. Each electronic element includes a microprocessor-controlled transceiver, which receives data on the location of the swimmer along the x-y-z axes from an underwater acoustic transponder located on the diver, which is located in the dive area. The system provides the user with a choice by collecting swimmer's underwater virtual reality data through a communication line. Many sensors in the immediate vicinity of the swimmer's head transmit the acceleration, horizontal and vertical position of the diver's head to a signal decoder located on at least one of the electronic modules on the surface via a communication line. A pair of projectors and optical elements is installed for each of the swimmer's eyes on a swimming mask. The image of virtual reality is reproduced by the graphics processor in real time, depending on the position and orientation of the swimmer and his head. Thereby, the swimmer can be in virtual reality in a selected place and with selected marine inhabitants. The method for simulating virtual reality of underwater swimming in the selected environment includes the following steps: determining the area of diving by at least three electronic elements located on the surface and their location close to the place of diving, as well as a processor controlled transceiver in each of these electronic elements; receiving data from a sonar transponder located on the swimmer by a transceiver, providing the swimmer with data through a communication channel with a graphics processor in one of the electronic surface elements; broadcasting visual data by optical elements. The system is a product complicated technically and in operation and it is also possible for the swimmer to leave the simulation zone, that is, to be outside the range of the measuring devices.

In the known virtual object control systems, the main result being achieved by using a wire rope system (cables, tension cables) is the impact on the user, allowing him to feel the virtual forces (for example, WO2010130346, WO2008070584). Modeling in virtual space is carried out on the basis of the known absolute coordinates of the user in a fixed system associated with wire ropes (tension cables). Therefore, there are used separate tracking modules, or information on the tension cable lengths allowing to accurately determine the coordinates of the point of attachment of tension cables. But the information about the force applied by the user for such systems is not enough. The known systems of this kind are devices based on, for example, a frame with a large number of wire ropes (tension cables), drives and (or) other devices for controlling the length and tension of cables, as well as devices for determining the position of the user or other parts of the system. Moreover, systems designed to transmit feedback to an object imply fixing it so that any permissible movements of the virtual object associated with the physical body, including its permissible rotations, can be transmitted to the body by changing the length of the tension cables. Therefore, the tension cables are attached to different points of the physical body, depriving it and the system of the possibility of free rotation, and thus, requiring a sufficient number of tension cables (three or more).

3. Technical Challenge

The claimed group of inventions is aimed at solving the technical challenge of creating a realistic simulation of the behavior of a real object in virtual space using a more simple technically and in operation device with great functionality and development potential. The problem is solved by achieving a technical result, which consists in providing the possibility of creating a physical model for the behavior of a real object associated with the object in virtual reality, by determining the user's efforts to bring the system out of equilibrium. The claimed system can be used to simulate various types of user movements in a limited real space, while not requiring complex installation systems for its operation.

SUMMARY OF THE INVENTION

The being claimed system of virtual object control by means of user efforts aimed at moving a physical body associated with a virtual object fixed with a system of at least one tension cable, so that the tension cable system is able to hold the body in a state of stable equilibrium with the possibility of rotation of the body around at least one axis passing near its center of mass, containing elements that determine the orientation of the physical body in space, as well as the magnitude and direction (vector) of the force acting on the physical body from the side of the tension cable system (for example, using a triaxial sensor for determining the force vector).

Additionally, the system may comprise an element determining an acceleration of the physical body.

It is preferable, for any user effort to move the physical body not exceeding the maximum expected force, there should always be at least one tension cable of the system having a non-zero tension.

The tension cable system in this case may comprise of a single tension cable capable for holding the physical body in the air in a suspended state, while the maximum force expected from the user does not exceed the weight of the physical body. Or the tension cable system comprises of two tension cables capable holding the physical body, being tensed in opposite directions.

When implementing the system in a liquid medium (water), the system of tension cables may consist of a single tension capable to hold the physical body with negative buoyancy in a suspended state, and the maximum expected force should not exceed the difference between the values of gravity and buoyancy force acting on the physical body. Alternatively the system of tension cables consists of a single tension cable capable to hold the physical body with positive buoyancy in a liquid medium from ascent, and the maximum expected force does not exceed the difference between the buoyancy force and gravity acting on the physical body.

At least one tension cable of the system may include a segment that implements the function of uncoupling the tension cable, or a segment with the possibility of free rotation around an axis parallel to the axis of the tension, or a segment that allows the measurement of the magnitude of the tension force of the tension cable. Moreover, each tension cable should preferably be equipped with a tensometer to measure its tension. Fixing the tension cables can be carried out using a system of blocks or weights.

When simulating swimming, a swimmer is considered to be a physical body with equipment attached thereto, which includes a visual information display device (for example, a virtual reality headset combined with a swimming mask). In this case, the being claimed system may include a breathing and air supply system, a wired channel of which is located along one of the controller tension cable.

The connection of the tension cable with the physical body should preferably be done using fasteners allowing the physical body to rotate around one or more axes passing near the center of mass of the physical body. Such a fastening may consist of an inner ring, made with the possibility for fastening to the controlled physical body and for rotation inside the outer ring, and also contains a bracket allowing rotation about an axis perpendicular to the axis of the rings.

For determining the direction of the tension cable's tension force, a magnet can be located on it, and a magnetometer be mounted near the magnet in the center of mass of the physical body.

The being claimed method for controlling a virtual object through user efforts aimed at moving the physical body associated with the virtual object fixed in a position of stable equilibrium using a system of at least one tension cable, whereas the improvement consists in:
  determining the initial conditions of the environment in which the physical body is located,
  determining vectors of the tension cables' tension forces,
  calculating of the vector of the force applied by the user,
  using the calculated force to simulate the behavior of the virtual object.

Additionally, vectors of significant external forces acting on the physical body as well as the self-acceleration vector of the physical body can be determined.

Depending on the goals of the simulator, a tension cables' pre-tension level can be set.

If the user acts as a physical body, it is preferable to determine the position of the stereo camera corresponding to the eyes of the user in the coordinate system of the virtual world.

Positive Effects Due to the Group of Inventions

The main objective of the being claimed group of inventions is the measurement of the magnitude and direction of the force exerted by the user on the tension cable system holding him within the limits of a constrained volume; for example, by a swimmer—on the tension cables holding him in a certain volume at a given level in an indoor or outdoor water pool.

The determination of the force applied by the user is made by determining the force vectors acting on the user-retaining elements—the tension cables, and is used to calculate his movements in the virtual space within the framework of a given physical model of the virtual world in which he is not fixed in one place. Thus, the user, acting on the tension cables fixed on him or outside his body with a certain effort and in a certain direction, controls his movements in virtual space. For example, a swimmer, making efforts consistent with his intention to swim in a given direction, can actually move in this direction in virtual space. The data obtained are used for realistic simulation of his movement (swimming) in virtual space.

In comparison with the known analogues, using tensioned cables as a mechanism for influencing the user or receiving feedback from him, the claimed solution allows simulating a wider range of user actions: from driving vehicles by acting on a controlled physical body to directed movements of the user himself in different environments (air, water). There is no need to determine the actual coordinates of the user; the simulation is based on the calculated user effort to move. Such a mechanism greatly simplifies the system, without compromising the effectiveness of immersing the user in a virtual environment but maintaining the realism of simulation.

The being claimed system is designed to determine the displacement of the center of mass of the physical body through the measurement of the applied force. In this case, the body, unlike the known systems, retains all degrees of freedom, the possibility of rotation relative to all axes that are available for the virtual body in the virtual model. Therefore, the implementation of the system does not require a large number of tension cables, and in the presence of two or more tension cables, the points of application of forces should coincide substantially so as not to limit the freedom of rotation of the object.

BRIEF DESCRIPTION OF THE DRAWINGS

The essence of the group of inventions is illustrated by figures, which depict.

DETAILED DESCRIPTION OF THE PREFERRED EMBODIMENTS

The being claimed virtual object control system (hereinafter—CS) through the movement by a user of a physical body associated with a virtual object is a combination of at least the following elements:
  The element that determines the orientation of the physical body in space, rigidly fixed to the controlled physical body or being part of it,
  The system comprising of at least one tension cable for holding the physical body in equilibrium, provided that the tension cable is connected at one end via fasteners to the physical body and the other to a fixed support or support, the mobility of which can be neglected.
  The elements for measuring the magnitude and direction of the force acting on the physical body from the system of tension cables, through determining their tension.

To construct a more accurate physical model, there can be determined self-acceleration of the physical body, which, however, can be neglected for small amplitudes of movements.

The system of tension cables ensures that the controlled physical body is within a given volume with the possibility for rotation of the body around at least one axis passing close to its center of mass. At the same time, the presence of a point of stable equilibrium will make it possible for the body to strive to return to its initial position in the absence of user efforts. Due to this, a model of free movement in the virtual world can be created when the user is in a limited physical space.

The main purpose of the CS is to determine the vector of force applied by the user to the controlled body, as well as to its orientation in space. These data allow, based on user actions aimed at overcoming the equilibrium of the controlled body, to calculate the physical model and create a realistic simulation in virtual space.

The controlled physical body is a real object whose orientation and force on which are measured and used to calculate the position (behavior) of its corresponding body in virtual space. The controlled physical body may be a device casing held by the user or the user himself with the equipment attached to him.

The controlled body is held by a system of tension cables and fasteners. By a tension cable is meant a cable, wire rope, rope or other product, including elastic one, which is used to limit the movements of the controlled body.

The tension cable may consist of several segments connected by various adapters, among which, for example:
providing rotation of the tension cable segments around its axis (around an axis parallel to the axis of the tension cable) in order to prevent twisting of the tension cable,
snap hooks for coupling (uncoupling) the stretch marks,
adapters that measure the magnitude of the tension,
adapters—tension direction markers.

The tension direction marker is an element that has a constant orientation with respect to the axis of the tension cable, used to determine the direction of the tension cable's tension vector. It can be a magnetic element with a magnetic axis that coincides with the axis of the tension cable, mounted on it, or connecting its segments.

To connect the tension cable with the controlled physical body, a fastener is used which may consist of several elements that are movable relative to each other, for example, rotary joints allowing the controlled body to rotate around the axes passing near the center of measurement.

The measurement center of the controlled body is understood to mean a point or a small area relative to the size of the body in which the force applied to the controlled body is measured. The center of measurement should be close to the center of mass of the controlled body so that the necessary measurement accuracy is ensured. It corresponds to the material point—the center of mass of the virtual body, used to build up a physical model of the movement of the virtual body.

The CS can have various design versions depending, including on the number of tension cables, their location and the environment in which the controlled body is located (for example, air or water).

In the case where one tension cable is used, the control system can be a suspension device (see FIG. 1)—the controlled physical body, which is the measuring unit 2, placed on the tension cable 1, fixed above the user. This embodiment is used, for example, to simulate driving a vehicle in a computer game. For the same purposes, the fixation point of the tension cable can be located below the controlled physical body as the center of mass. The devices are simple structurally, in the installation (only one attachment point is needed) and in operation being capable for solving a wide range of tasks.

Figure 1:
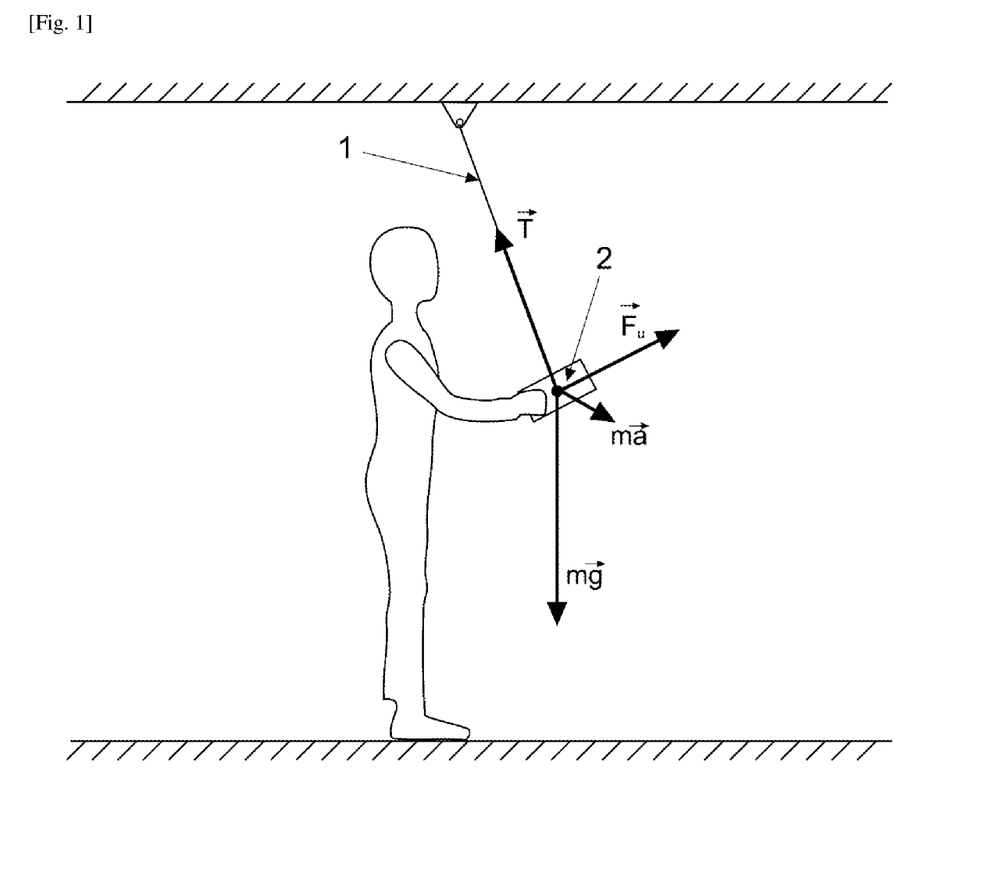
FIG. 1—The embodiment of the system where a controlled physical body is suspended on a single tension cable.

The user can, while standing on the floor, act on the body (measuring unit 2) by pushing, pulling, lifting, pressing and turning around the attachment point of the tension cable 1 (around the support). In this case, any user efforts to remove the body from the equilibrium position will not be able to distance it to a distance greater than the length of the tension cable 1. In virtual space, such effects can be interpreted, for example, as controlling the rotation and acceleration of a submarine, helicopter and spacecraft.

To ensure high quality and stability of the simulation, it is necessary to pre-tense the tension cable 1. Its value is determined depending on the value of the expected maximum force that the user can apply so that the tension is not completely relieved from the tension cable 1. The magnitude of this maximum force may vary for simulators of various kinds, depending, for example, on the expected nature of the user's movements. So in a recreational simulator, the user's movements are smoother, which requires less pre-tension of the tension cable than, for example, a sports simulator.

It is necessary that during the simulation, at least one tension cable 1 of the system has a non-zero tension such that when the user applies the specified maximum expected force, the tension will not be completely relieved from tension cable 1. If the tension is completely relieved, the recorded direction of tension will be changed and the measurement of a further increase of the force will become unreliable until returning to pre-set limits.

The pre-tension of the tension cable 1 in the suspended embodiment may be provided by the weight of the controlled physical body. A weight should be selected that will not allow the user to comfortably hold the physical body for a considerable time within the simulator time scale in the position when tension is relieved from the tension cable 1 (for example, as lifting up the weight of 10 kg).

When implementing the embodiment of the CS, in which the tension cable 1 is fixed below the level of the controlled body, a constant tension can be created due to the application of additional force by the user. That is, in order for the user to remain in one place in a virtual environment, a constant application of a force sufficient for tension at least one of the tension cables 1 of the system is necessary. Such a force will be accepted in the simulator as zero.

Another pre-tensioning embodiment option allows achieving pre-tensioning, which involves using the system of tension cables 1 (see FIG. 2) such that at least one of them is capable to compensate for relieving the tension from the other tension cable 1. For example, two oppositely tensed tension cables 1, where the efforts of the user, leading to relieving the tension from one tension cable 1 will lead to its increase on the other. The force applied by the user is recorded based on the tension direction of the second tension cable 1, the magnitude of which increases. Such an embodiment may be a desktop device for three-dimensional modeling or games.

For other purposes, more tension cables 1 may be used.

Measurements for physical modeling based on user actions can be made through the use of:
a gyroscope for determining the orientation of the physical body in space, which is fixed motionless relative to it,
an accelerometer for determining self-acceleration of the controlled physical body,
a tensometer for determining the magnitude of the tension force of the tension cables 1,
a sensor determining the direction of tension of the tension cable 1 (the detailed example of the embodiment is considered below).
either a triaxial sensor for force vector registration.

Figure 2:
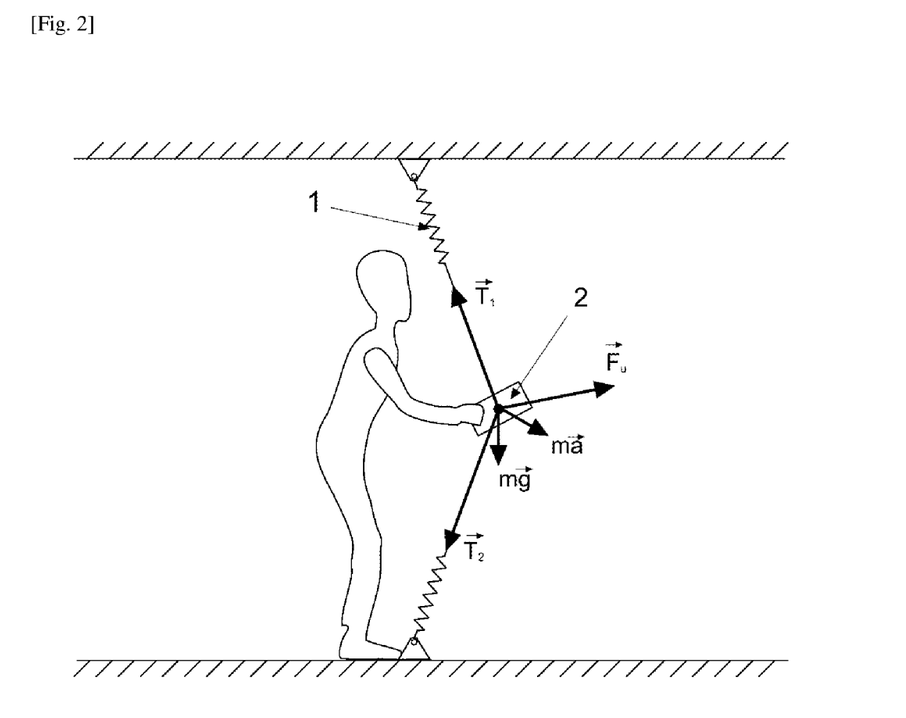
FIG. 2—The embodiment of the system where a controlled physical body is installed between two oppositely tensed tension cables,
  FIG. 3—The embodiment of the system where a swimmer is held from ascent by means of a single tension cable fixed at the bottom,
  FIG. 4—The system for attaching tension cables to the swimmer's belt,
  FIG. 5—The embodiment of the system for snorkeling,
  FIG. 6—The embodiment of the system where a swimmer is held from diving by means of a single tension cable fixed on shore,
  FIG. 7—The system for attaching two tension cables to the swimmer's belt,
  FIG. 8—The system comprising of a magnet and magnetometer to determine the tension direction of the tension cable,
  FIG. 9—The vectors of forces acting in the center of measurements,
  FIG. 10—The vectors of forces of the swimmer's attitude of rest,
  FIG. 11—The interrelation of coordinate systems.

It is preferably for the meters to be located in a single housing of the measuring unit 2, to which a force is applied and which represents the center of mass or is fixed in the center of mass. Measuring instruments of force and direction of tension can be located beyond the housing. In particular, the tensometer can be located at the input to the measuring unit 2 in the place of its contact with the tension cable 1 or at an arbitrary location of the tension cable 1.

Information about the measurement results from all meters can be transmitted to the central controller, which thereunto processes the incoming data and transmits the results via a wired or wireless channel to an information output device—a simulation device. Each meter can independently transmit information to a device for collecting and processing information.

The number of meters determining the direction and magnitude of the tension depends on the number of the tension cables 1. When using more than tension cable 1, the user's influence on each should be taken into account. At the same time, when using a large number of the tension cables 1 and the known geometry of the system, the data on the tension of some tension cables 1 can be calculated based on the known data on the tension of the other tension cables 1.

A device that performs the function of measuring the value of tension in the system (for example, a tensometer) is selected based on the planned maximum load and taking into account the necessary measurement accuracy. The maximum load includes both the tension created by the user in the process of using the system, and the previously created tension. The requirements for the size of the permissible load are also applicable to the tension cables 1 of the system.

The computing equipment needed to run a virtual reality simulation program may be located on the user's body, including as a mobile device used as a display inside the VR headset.

The claimed CS can be applied as follows.

There should be preliminary determined the initial conditions of the environment in which the physical object and, preferably, significant external forces acting on it (for example, gravity).

The physical body is fixed in equilibrium using the system of the tension cables 1. The user, in the process of using the simulator, exerts some efforts on the physical body to which the tension cable 1 responds by changing the magnitude and (or) direction of tension.

To determine the magnitude of the force applied by the user, the response force vectors of the tension cables 1 to the user's efforts are measured, preferably the vector of the self-acceleration of the physical body, and also the vectors of known significant external forces acting on the body are calculated. The force applied by the user is calculated, for example, by subtracting from the resultant of all the forces acting on the body, the sum of the reaction forces of all the tension cables 1 and all the known significant external forces acting on the body. The resulting forces acting on the body are calculated as the product of the known mass of the physical body and the measured vector of its actual acceleration.

In this case, some forces may be neglected that do not significantly affect the accuracy of the calculations in the specific context of controlling a virtual object. For example, these are the forces of resistance of the medium and friction. And in the case of small amplitude of movements of a physical object, the real acceleration of the physical body may be neglected.

The calculated force applied by the user is transmitted to the program simulating the impact on the virtual object, and is used for modeling the force acting on the virtual object. To calculate the movements of the virtual object, the calculated force applied by the user to the physical body is scaled in accordance with the control context, and other determined by the context forces acting on the virtual object are added to it.

The CS can be adapted for use underwater when simulating swimming.

The swimming simulation system (see FIG. 3) in this case preferably consists of a sealed VR headset combined with a swimming mask 3, a breathing and air supply system 4, buoyancy compensators 5 providing constant non-zero tension, unit 2 for measuring the orientation and tension force fixed on the belt near the swimmer's center of gravity, and the tension cable 1, which holds the swimmer at the required level of the pool's depth, preventing its ascent or excessive immersion. In this case, the controlled physical body is the user with the equipment attached to him, including the measuring unit 2.

Figure 3:
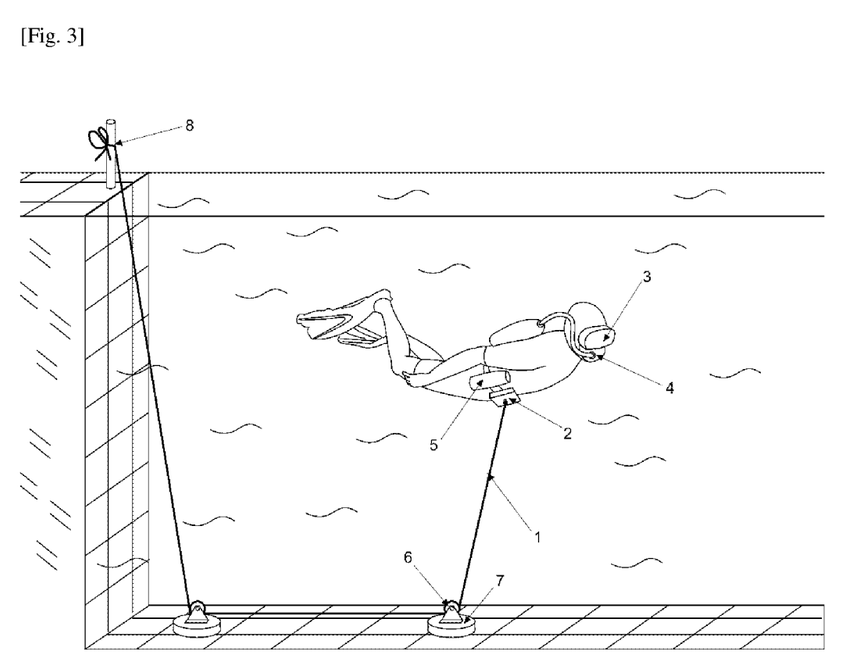

The solution uses a non-rigid fixation of the swimmer within a limited volume of water and can be implemented depending on the method for installing the tension cables 1 in any pool of sufficient depth or in open waters. When calculating the system, it is necessary to take into account the available volume of movements of the swimmer without collision with the walls, bottom and surface of the volume in which he is located. In this case, rotation with respect to all three mutually perpendicular axes passing near the center of mass can be maintained.

In order to ensure the swimmer's safety and ease of use by a swimmer, the tension cable 1 can be passed through a system of blocks 6 located on the bottom (and (or) held by loads 7) and fixed on a solid surface—on shore at point 8. The fastening should be done in such a way that in the event of a depressurization of the mask or a violation of the air supply system, an observer on the shore can urgently release the end of the tension cable 1, ensuring the swimmer to ascend. The possibility for quick emergency disconnection from the tension cable 1 must have the swimmer himself. An automatic disconnection system can also be used when system malfunctions are detected.

Figure 4:
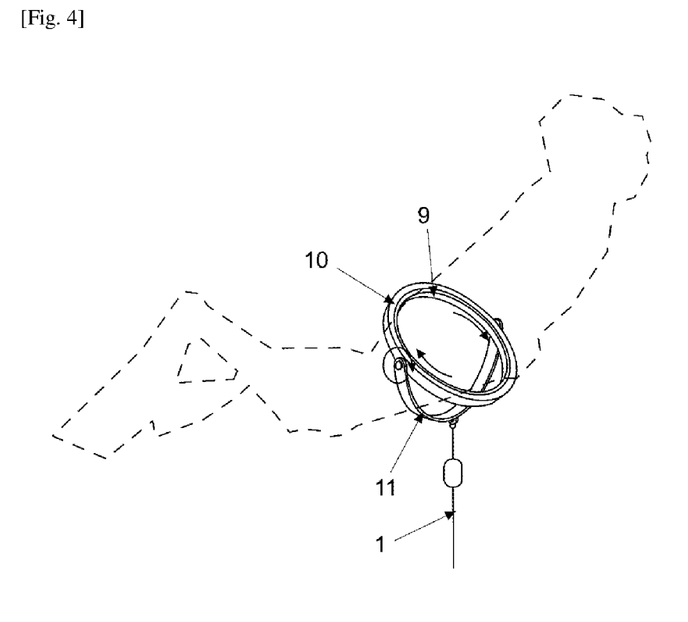

The tension cable 1 is attached to the swimmer's belt allowing him to perform basic movements other than turning the swimmer's body around its axis and somersaults. The greater freedom of movement can be ensured by using pivot-type coupling in connecting the tension cable to the physical body. Such a fastening may be a system (see FIG. 4) comprising an inner ring 9 attached to the swimmer's belt, an outer ring 10 inside which the inner ring 9 freely rotates, and a clevis bracket 11 allowing rotation around an axis perpendicular to the axis of the rings. This allows the swimmer to rotate around his axis, as well as transfer the point relative to which the physical body rotates from a point on the body surface (on the belt) to the center of the rings, which more closely corresponds to the actual position of its center of mass.

The buoyancy compensators 5 provide for the preliminary tension of the tension cable 1, holding the swimmer at a pre-set level of the depth in the pool. The use of compensator 5 with adjustable buoyancy, for example, a compensatory diver's vest, will allow to adjust the tension. A swimmer, pumping the vest with air from a pressure vessel, changes the force of Archimedes acting on him within a few kilograms of force. In this case, the tension value of the tension cable 1 can be set so as to consider the diver in virtual reality being in the attitude of rest.

If a compensator 5 is used, the buoyancy of which is not adjustable (plastic foam belt, vest), then the tension corresponding to the resting state in virtual reality should coincide with the tension created by the swimmer who does not exert any effort. When using the same equipment, this value can vary within certain limits (depending on the volume of the swimmer's body and its density). In general, the density of the human body is close to the density of water, so it can be assumed that the neutral tension of the tension cable 1 will be close to the force of Archimedes acting on the swimmer's equipment minus the weight of the equipment. For example, a plastic foam belt/is used, on which the force of Archimedes, corresponding to a weight of 10 kg, acts. Then the exact neutral tension will be determined during the calibration process after the swimmer is immersed as the tension of the tension cable 1 in the state when the swimmer is not moving.

A swimmer may be held by a single tension cable 1 (see FIG. 3) fixed at one end to his belt and the other at the bottom of the pool (for example, using a suction cup and/or load 7). Compensators 5 for creating positive buoyancy must be selected so that the swimmer is not physically able to create a diving force that completely relieves the tension of the tension cable 1 attached to the bottom. In equilibrium, the tension force of the tension cable 1 is equal to the difference between the buoyancy force (Archimedes) and gravity, acting on the body. So the force of Archimedes acting on a swimmer with the buoyancy compensator 5 should be such that the difference in its magnitude and the magnitude of the force of gravity acting on the body is not less than the maximum force that the swimmer can produce.

In this case, the minimum tension of the tension cable 1 will be observed at the moment the swimmer moves vertically downward. If it is assumed that the maximum pulling force developed by the swimmer during the simulation is a force of 100 N (approximately corresponding to lifting up a weight of 10 kg), then the tension of the tension cable 1 in the neutral state (when the swimmer makes no effort) should not be less than 100 N. Then, even with intense downward movement, the tension of the tension cable 1 will not be equal to zero. If the planned maximum effort is exceeded, the tension cable 1 will slack, affecting the simulation realism for a while.

The maximum tension of the tension cable 1 will be observed with the swimmer moving vertically upward. At the same time, the swimmer's effort (another 100 N) will be added to the initial tension of the tension cable 1 (100 N) constituting the maximum of 200 N. Thus, the tension cable 1 must withstand a load of at least 20 kg.

Figure 5:
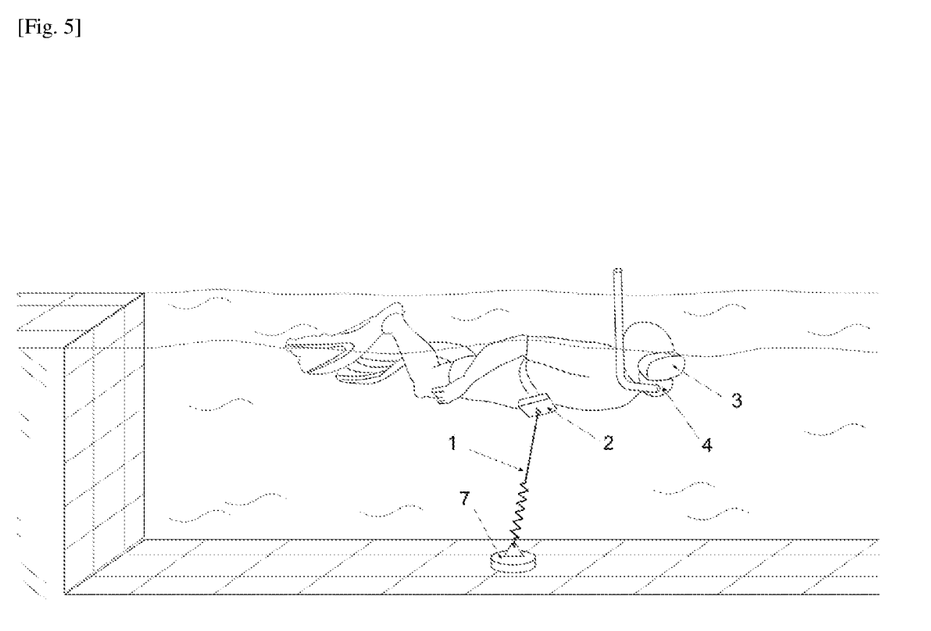

In addition, it is possible to simulate snorkeling, which is less demanding on the depth of the pool and does not require complex breathing equipment. For the implementation (see FIG. 5), a shallow pool with an elastic tension cable 1 attached to the bottom and to the swimmer's belt is sufficient. To reduce the component of the force pulling the swimmer down, on the back side of the belt a buoyancy compensator 5 can be arranged allowing the swimmer to move along the surface of the water. In this case, a water level sensor may additionally be located on the outer part of the mask in order to provide information about the head position above the water surface to the simulation system. To simplify the design, rotation relative to the longitudinal axis of the swimmer may be limited.

In another embodiment (see FIG. 6), the tension cable 1 can be fixed above the swimmer—at a fixed point 8 on shore, or a point whose mobility can be neglected in the framework of a simulation (for example, on a fixed swimming vehicle with a mass significantly exceeding swimmer's weight). In this case, compensators 5 are used that provide negative buoyancy allowing a swimmer to be prevented from ascent and thereby relieving the tension from the tension cable 1.

Figure 6:
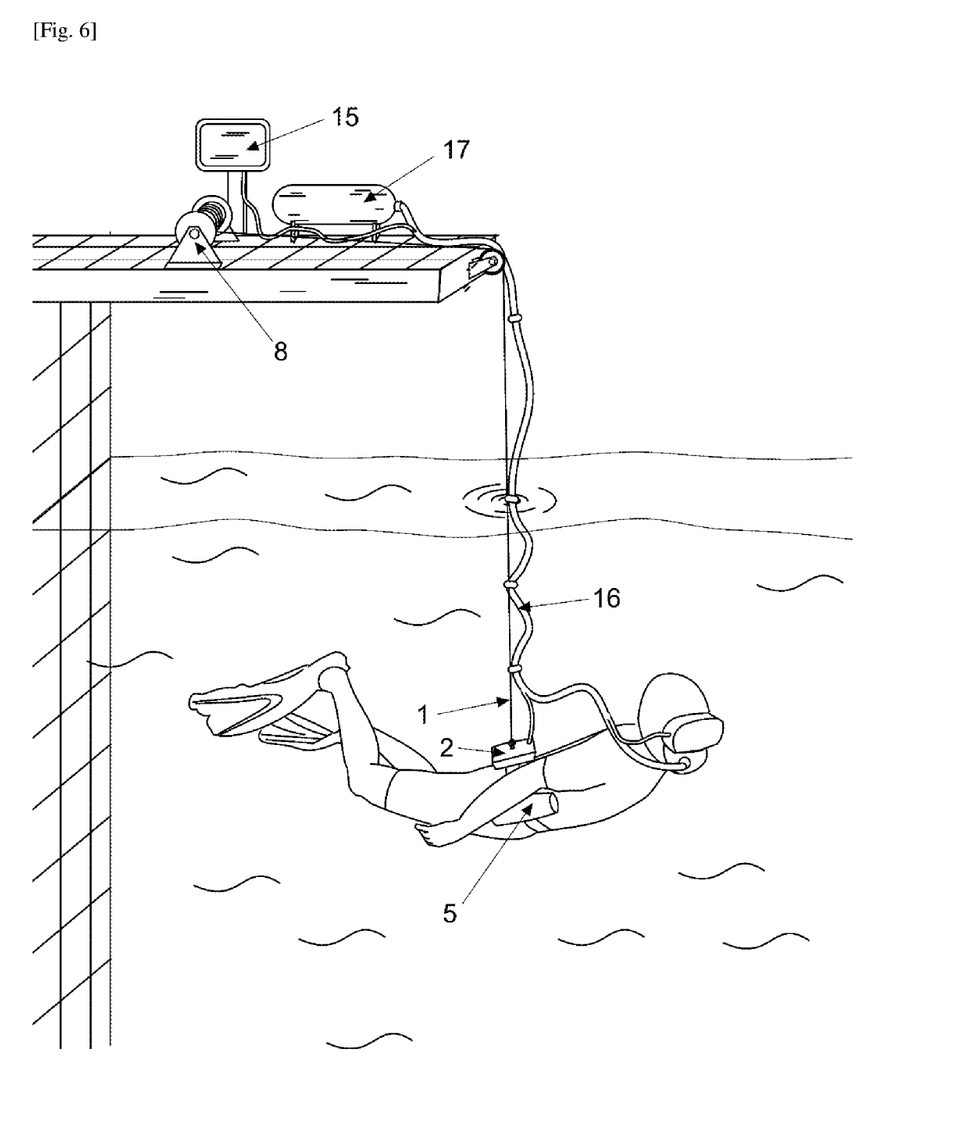

In this case, the maximum expected swimmer effort should not exceed the difference between the values of gravity and buoyancy force acting on the physical body.

Figure 7:
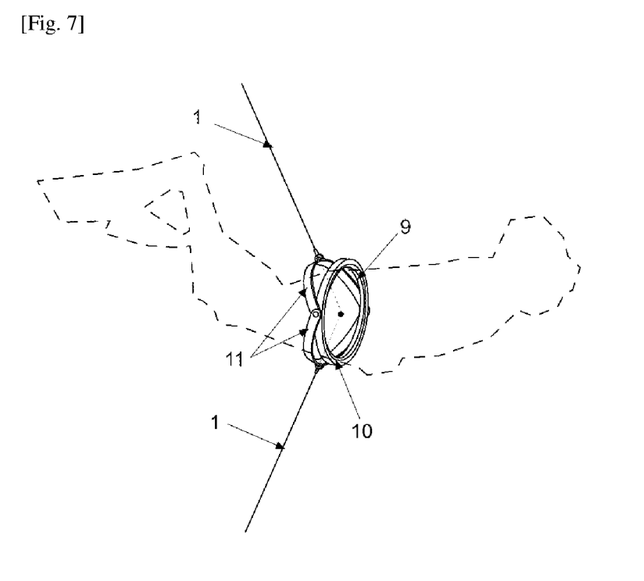

If the simulation program provides for sufficiently large, dynamic loads, significant pre-tensioning may be required at which a swimmer, while attempting to accelerate rapidly, will experience significant counteraction from his belt. This can lead to the feeling of jerking, which will negatively affect the quality of the simulation and comfort of the swimmer. To overcome this drawback, a system of two tension cables 1 tensed vertically in opposite directions can be used. The tension cables 1 may have elasticity to ensure mobility of the swimmer near the equilibrium point and the absence of belt jerks during acceleration. In this case, the both tension cables 1 must be fixed so as to allow the swimmer rotating around the same point. Since it is difficult to fix the tension cables 1 at one point on the belt, to achieve this result, the tension cables 1 fixing system described above can be used, containing two arcs with a common axis of rotation (see FIG. 7).

Figure 8:
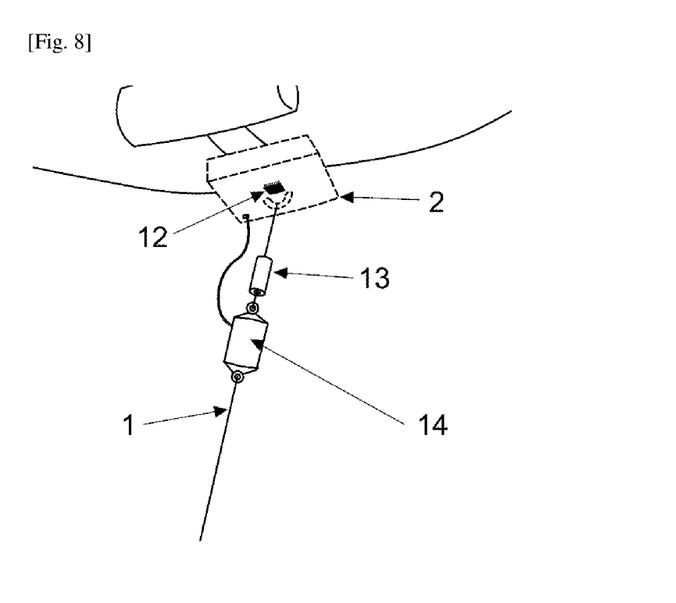

To measure the direction of tension, there is used the system (see FIG. 8) of a triaxial magnetometer 12 located inside the measuring unit 2 near the attachment point of the tension cable 1, as well as a magnet 13 located on the tension cable 1 near the unit 2 in such a way that the north-south axis of the magnet 13 coincides with the direction of the tension cable 1. The strength of the magnet 13 and the distance from it to the magnetometer 12 can be chosen in such a way that the intensity of the Earth's natural magnetic field can be neglected in comparison with the intensity created by the magnet 13 at the location point of the magnetometer 12. Then the direction of the tension vector of the tension cable 1 relative to the magnetometer 12 (and hence the block 2) can be calculated based on the direction of the magnetic field vector measured by the magnetometer 12. For example, a permanent cylindrical neodymium magnet with a diameter of 10 mm and a length of 25 mm with an axial hole of 5 mm, with a polarization direction coinciding with the axis of the cylinder, located at the tension cable 1 at a distance of 50 mm from the magnetometer, creates a magnetic field strength of more than 1,000 µT at a natural earth field strength of less than 50 µT. In this case, the tension value of the tension cable 1 can be determined by the tensometer 14 located on it. The described devices are one example of a sealed implementation of a tension meter, instead of which other known methods and devices can be used to determine the vector of the tension force.

The computing equipment 15 can be located on the swimmer's body (including the mobile device inside the VR headset 3), or partially located on shore making it possible to use the large computing power of a stationary computing device (see FIG. 6). The necessary communication between the equipment of the swimmer and the shore can be carried out through a wired channel running parallel to the tension cable 1, thus not creating additional restrictions when the swimmer is moving.

The air supply system for a swimmer can be a regular scuba gear (relevant for realistic scuba diving simulators). An implementation is also possible, where the air supply channel 16 for the breathing system 4 also runs parallel to the tension cable 1, and the air cylinder (compressor) 17 is located on shore.

To provide a more realistic experience of using the simulator, the system may include additional meters. For example, these are: determining the bending of individual parts of the body, including the back of the swimmer. Additionally, sensors can be used that record possible emergency situations, such as water entering under the mask, violation of the air supply system, exceeding the acceptable values of the swimmer's pulse rate, and others allowing to activate the automatic emergency ascent system.

The virtual object control system described above can be used in conjunction with other known virtual reality controllers. For example, in combination with a hand position recognition system, such as LeapMotion™, it allows a swimmer to see virtual hands and interact with virtual objects. Depending on the nature of the simulator, separate controllers simulating weapons and other additional equipment can be used. To accurately determine the position of body parts under water, external cameras such as Kinect® offered by Microsoft® Corp. (adapted to work in an appropriate environment) can be used.

Consider the work of the CS on the example when a swimmer with a compensator 5 providing positive buoyancy, is held by the tension cable 1 from ascent.

Pre-set pre-tension of the tension cable 1 is a zero tension level depending on the goals of the simulator. When using the simulator for relaxed swimming, zero tension can be small (the minimum possible), for example, 5 kg. In this case, the swimmer experiences slight belt pressure. If the simulator assumes initially more intensive swimming, the zero level of tension is set larger, for example, 10 kilograms.

When has dived the swimmer attaches the tension cable 1 to the belt. The tension force of the tension cable 1 at this moment is less than the set 5 kg, so in virtual reality the swimmer gravitates to the bottom. The swimmer pumps air into the vest and in reality is in the same place, held by the tension cable 1. In this case, the tension of the tension cable 1 increases, the swimmer's diving in virtual reality slows down and then stops when the tension cable 1 reaches the set zero tension level.

In case of exceeding the expected maximum force, as well as other errors in the measurement of forces, determination of the zero point, etc. the control over the force will be temporarily interrupted, which in virtual reality is perceived by the swimmer as the action of some extraneous forces (for example, undercurrents). Operating experience of the system showed that a small error in this case is perceived quite naturally, that is, it does not have a critical effect on the realism of the simulation. When efforts return to acceptable limits, the realism of perceptions will be restored.

The CS meters measure the value and direction of a swimmer's application of force, the orientation and acceleration of the controlled physical body located on the belt at the center of gravity and buoyancy of the swimmer. The measuring unit 2 can transmit raw sensor readings to the simulation program, or perform some computations using its own resources. For example, an implementation is possible when the CS transfers to the simulation program the orientation angles of the swimmer and the calculated swimmer's force vector.

Consider the physical model by which calculations can be made, assuming that the attachment points of the tension cable 1, the center of gravity and the swimmer's buoyancy center coincide. In this case (see FIG. 9), the resultant force ma is the sum of the gravity force mg, the cable tension force T, the Archimedes force Fa and the force Fu equal to the sum applied by the swimmer and the water resistance force.

Figure 9:
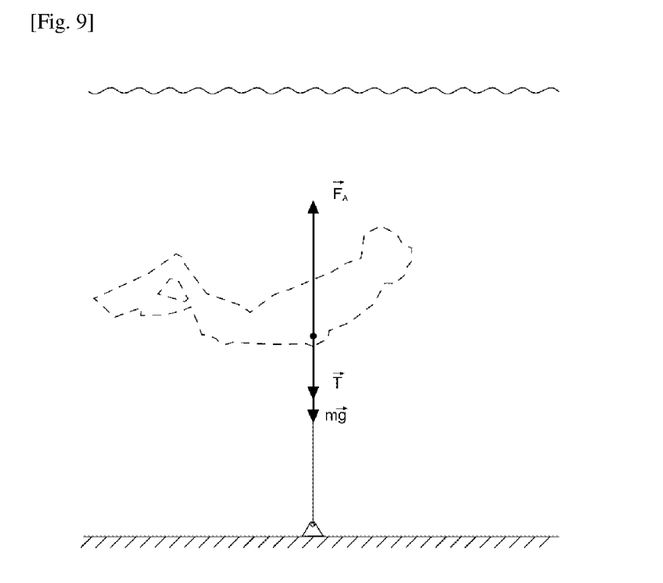

The resistance force of water when moving a fixed swimmer at low speeds can be neglected, and the force Fu be taken equal to the actual efforts of the swimmer to move. The force Fu applied by the swimmer to move can be calculated as the difference between the resultant force ma and the forces mg, the tension force T, the buoyancy force Fa (1)

$$\vec{F}_u = m\vec{a} - (m\vec{g} + \vec{T} + \vec{F}_a).$$    [Mathematical formula (1)]

According to Newton's first law, the resultant of the forces ma at each moment of time is equal to the product of the equipped swimmer's mass by its acceleration. The swimmer's mass is known and constant, the acceleration vector is recorded using a triaxial accelerometer sensor located near the center of mass. The gravity force mg is calculated as the product of the free-fall acceleration by the swimmer's mass with equipment.

The force of Archimedes is not constant, since it is associated with a change in the swimmer's volume during breathing, however, part of it related to inspiration and expiration can be considered as a component of the swimmer's efforts Fu aimed at vertical movement. In the same way, the effort directed by the swimmer towards vertical movement will be considered to be inflation/bleeding of air to/from the diver's buoyancy vest. Therefore, the force Fa is understood to mean a constant buoyant force equal to the force of Archimedes acting on a swimmer in a condition accepted as neutral, for example, in a state of shallow inspiration. This force can be measured at the beginning of the session at rest, when the swimmer is stationary hovering over the attachment point of the tension cable 1. In this case, the resultant of the forces ma is equal to zero, the forces Fu applied by the swimmer are also equal to zero, which means the constant Archimedes force Fa is equal in magnitude and opposite in the direction of the sum of the known forces: gravitational ma and tension T (see FIG. 10).

Figure 10:
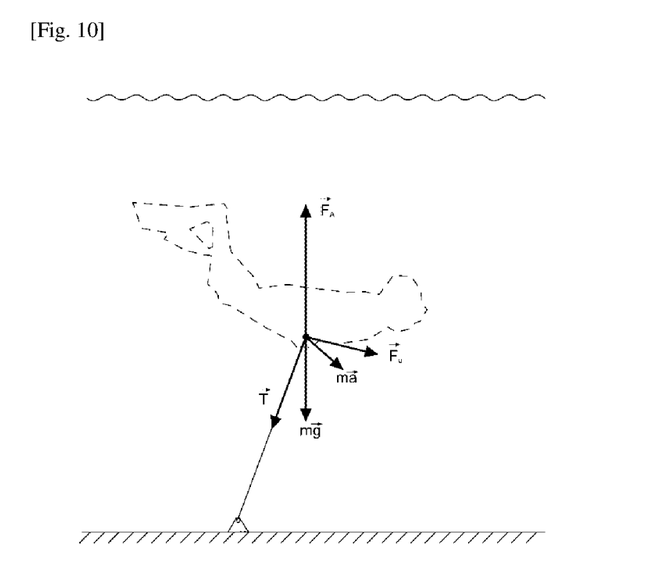

The force Fu applied by the swimmer at each moment of time, minus the water resistance, can be calculated using the known forces ma, mg, T, Fa. Neglecting the force of resistance, it can be assumed that the force Fu reflects the swimmer's real intention to change his speed.

The physical model using two tension cables 1 is calculated similarly, except that instead of a single tension force vector T, the total tension vector of the both tension cables T1+T2 should be calculated (vector sum, see FIG. 2). With known parameters of the geometry of the tension cables 1 and a given coefficient of elasticity, one of the tension vectors can be calculated through the other. Knowing the tensions of one of the tension cables 1 and the coefficient of its elasticity allows to determine its elongation, which, together with information about the position of the attachment points of the tension cables 1 and the angle of deviation of the first tension cable 1, allows to determine the elongation of the second tension cable 1 and the angle of its deviation, which allows to determine the tension force of the second tension cable 1. Due to calculation errors, installation geometry errors, as well as possible inconsistencies in the elastic coefficients, the use of the second tension measurement module seems preferable.

To simplify the calculations, a slightly different model can be used, in which to calculate the forces applied by the user, regardless of the nature of the constant external forces acting on the body, it is enough to know its mass, acceleration and change in the sum of the tension forces of the tension cables 1 relative to the sum of their tension forces in the equilibrium state.

Suppose a body is fixed by a system of N tension cables 1 attached to its center of mass in the state of stable equilibrium. It is known that some constant forces independent of time act on the body (such as the gravity force, Archimedes force), and the user can also act on it.

Then, according to Newton's second law, at any moment of time, the following formula is true (2)

$$m\vec{a} = \vec{T} + \vec{F}_{const} + \vec{F}_u$$ [Mathematical formula (2)]

where m is the mass of the body, a is the acceleration of the body (in this way, ma is the resultant of the forces acting on the body), T is the sum of all the forces acting on the body from the side of the tension cables 1, Fconst is the sum of all the time-independent forces acting on the body, Fu—the force applied by the user to move the body.

Then the force applied by the user to move the body can be calculated as (3)

$$\vec{F}_u = m\vec{a} - \vec{T} - \vec{F}_{const}$$ [Mathematical formula (3)]

Let To be the sum of all the forces acting on the body by the tension cables 1 in the state of equilibrium in the absence of user influence. Then the following equality is true (4)

$$\vec{T}_0 + \vec{F}_{const} = 0$$ [Mathematical formula (4)]

or (5)

$$\vec{F}_{const} = -\vec{T}_0$$ [Mathematical formula (5)]

In this case (3) takes the form:

(6)

$$\vec{F}_u = m\vec{a} - \vec{T} + \vec{T}_0$$ [Mathematical formula (6)]

The force vector estimated in one or another way is transmitted to the simulation program along with information about the current orientation of the controlled physical body in the world coordinate system, estimated, for example, using a gyroscope sensor located, for example, in measuring unit 2. Orientation sensors allow translating the forces calculated in the coordinate system of the device into the coordinate system of the world.

Figure 11:
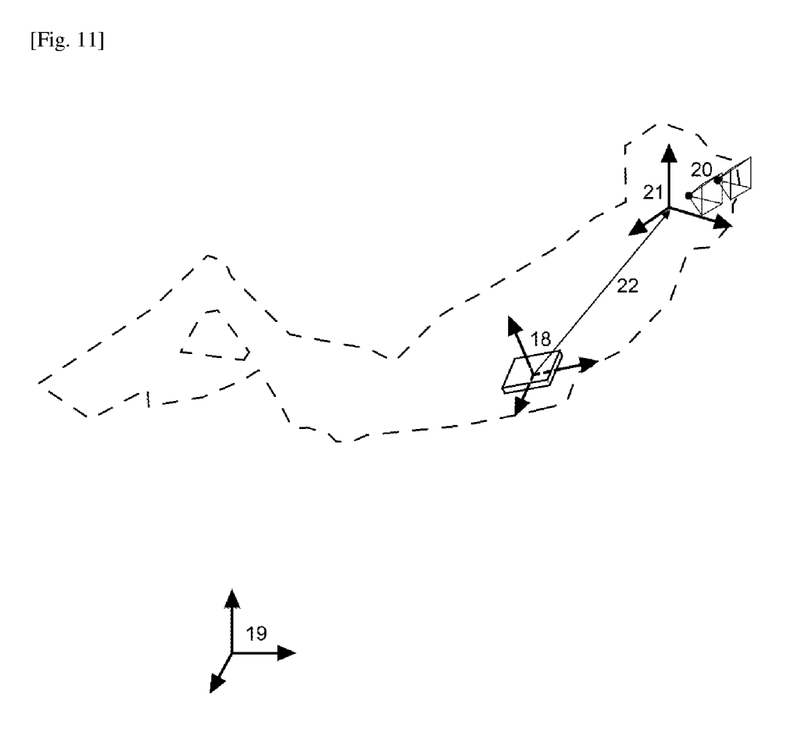

The simulation program calculates the effect of the applied force on the swimmer's body virtual object and controls the movement of the center of mass and the orientation of the swimmer's virtual body in virtual space, in other words, determines the position and orientation in the system of 18 coordinates associated with the swimmer's virtual body in the fixed system of 19 coordinates in virtual world (see FIG. 11). In such a case, the used estimate of the object mass may differ from the real one, the friction factor of the swimming environment, may differ from the friction factor of water, and other differences in the physical model of the virtual world can be used. Thus, for example, in virtual space, it is possible for the swimmer to move at speeds different from the usual underwater speeds, corresponding to the idea of the game or simulator.

For the user to correctly perceive the virtual world picture broadcast through the VR headset, it is necessary to calculate the position of the stereo camera 20 corresponding to the swimmer's eyes in the system of 19 coordinates in virtual world.

The VR headset 3 has its own orientation tracking sensors to detect the rotation of the swimmer's head regardless of the orientation of the controlled physical body. Therefore, for the correct calculation of the position of the camera 20 in virtual space, it is enough to know the coordinates of the origin of reference axes 21 associated with the swimmer's head and having a center of rotation at the turning point of the head (in this system the coordinates of the stereo camera 20 are constant) in 18 coordinates of the system associated with the center of the swimmer's body.

Without involving additional information, it may be proceeded from the assumption that the vector 22 "the swimmer's center of mass is the point of rotation of the head" connecting the origin of systems 18 and 21 in the coordinate system of swimmer 18 is unchanged and corresponds to the straightened state of the spine, the most natural for swimming.

A more accurate model for calculating the vector 22 can be constructed using information from additional sensors, for example, a sensor for bending the back, which will make it possible for the swimmer to more correctly visualize movements with a spine state different from the straightened.

Using the described physical model, a user fixed in a limited volume of physical space can move unlimitedly in virtual space in a direction controlled by swimming movements of the body, while looking in a direction determined by the actual position and direction of rotation of the head, which is to a large extent consistent with the perceptions that he would have experienced, really moving under water.

What is claimed is:

1. A system to control a virtual object through user efforts aimed at moving a physical body associated with the virtual object, fixed with a system of at least one tension cable, so that the at least one tension cable system is capable of holding the physical body in a position of stable equilibrium with the possibility for rotation of the physical body around at least one axis passing near its center of mass, containing elements that determine the orientation of the physical body in space, as well as the magnitude and direction of the force acting on the physical body from the at least one tension cable system.

2. The system of claim 1, wherein the system contains an element that determines the acceleration of the physical body.

3. The system of claim 1, wherein the system contains a triaxial sensor for determining the force vector applied to the physical body from the side of the at least one tension cable system.

4. The system of claim 1, wherein at least one tension cable of the at least one tension cable system has a non-zero tension upon movement of the physical body not exceeding a maximum expected force.

5. The system of claim 1, wherein the at least one tension cable system consists of a single tension cable capable to hold the physical body in the air in a suspended state, and the maximum force expected from the user does not exceed the weight of the physical body.

6. The system of claim 4, wherein the at least one tension cable system contains two tension cables, being tensioned in opposite directions, that are capable to hold the physical body.

7. The system of claim 4, wherein the at least one tension cable system consists of a single tension cable capable of holding the physical body with negative buoyancy in a liquid medium in a suspended state, and the maximum expected force does not exceed the difference between the values of gravity and buoyancy force acting at the physical body.

8. The system of claim 4, wherein the at least one tension cable system consists of a single tension cable capable of holding a physical body with positive buoyancy from ascending in a liquid medium, and the maximum expected force does not exceed the difference between the buoyancy and gravity force acting at the physical body.

9. The system of claim 1, wherein at least one of the tension cables of the at least one tension cable system contains a segment implementing the function of uncoupling the tension cable.

10. The system of claim 1, wherein at least one of the tension cables of the at least one tension cable system contains a segment enabling rotation around an axis parallel to the axis of the tension cable.

11. The system of claim 1, wherein at least one of the tension cables of the at least one tension cable system contains a segment allowing the measurement of the magnitude of the tension force of the tension cable.

12. The system of claim 1, wherein each tension cable is equipped with a tensiometer for measuring its tension value.

13. The system of claim 1, wherein the physical body is a swimmer with equipment fixed to the physical body, which includes a visual information display device.

14. The system of claim 13, wherein the visual information display device is made in the form of a virtual reality (VR) headset combined with a swimming mask.

15. The system of claim 13, wherein the system comprises a breathing and air supply system, the wired channel of which is located along one of the tension cables of the controller.

16. The system of claim 1, wherein the connection of the tension cable with the physical body is made using fasteners allowing rotation of the physical body relative to one or more axes passing near the center of mass of the physical body.

17. The system of claim 16, wherein the fasteners consist of an inner ring enabling fastening to a controlled physical body and rotation inside the outer ring, as well as a clevis bracket allowing rotation around an axis perpendicular to the axis of the outer rings.

18. The system of claim 1, wherein the system further comprises:
   a magnet to determine the tension force direction of the tension cable; and
   a magnetometer installed near the magnet in the center of mass of the physical body.

19. The system of claim 1, wherein the system comprises a system of blocks or weights for fixing the tension cable.

20. A method for controlling a virtual object by means of user efforts aimed at moving a physical body associated with a virtual object fixed in a position of stable equilibrium using a system of at least one tension cable comprising the steps of:
   determining the initial conditions of the environment in which the physical body is located;
   determining vectors of the tension cables' tension forces;
   calculating of the vector of the force applied by the user; and
   using the calculated force to simulate the behavior of the virtual object.

21. The method of claim 20, further comprising determining the vectors of significant external forces acting at the physical body.

22. The method of claim 20, further comprising determining the vector of self-acceleration of the physical body.

23. The method of claim 20, further comprising a level of pre-tension of the tension cables depending on a simulator's aims.

24. The method of claim 20, wherein if the user acts as a physical body, the method further comprising determining the position of stereo camera corresponding to the user's eyes in the coordinate system of virtual world.

* * * * *